(12) United States Patent
Cleaver

(10) Patent No.: US 9,969,852 B2
(45) Date of Patent: May 15, 2018

(54) EPOXY RESIN FORMULATIONS

(71) Applicant: Hexcel Composites Limited, Duxford (GB)

(72) Inventor: Matthew Cleaver, Haverhill Suffolk (GB)

(73) Assignee: Hexcel Composites Limited, Duxford (GB)

( * ) Notice: Subject to any disclaimer, the term of this patent is extended or adjusted under 35 U.S.C. 154(b) by 234 days.

(21) Appl. No.: 14/888,892

(22) PCT Filed: Jun. 17, 2014

(86) PCT No.: PCT/EP2014/062703
§ 371 (c)(1),
(2) Date: Nov. 3, 2015

(87) PCT Pub. No.: WO2014/202593
PCT Pub. Date: Dec. 24, 2014

(65) Prior Publication Data
US 2016/0083542 A1    Mar. 24, 2016

(30) Foreign Application Priority Data

Jun. 19, 2013 (GB) .................................. 1310955.8

(51) Int. Cl.
| | | |
|---|---|---|
| *C09J 163/00* | (2006.01) | |
| *C09J 161/00* | (2006.01) | |
| *C08J 5/24* | (2006.01) | |
| *C08J 5/04* | (2006.01) | |
| *B32B 15/14* | (2006.01) | |
| *C08G 59/56* | (2006.01) | |
| *C08G 59/50* | (2006.01) | |
| *C08G 59/22* | (2006.01) | |
| *B32B 7/12* | (2006.01) | |
| *B32B 15/20* | (2006.01) | |
| *C08L 63/00* | (2006.01) | |
| *C08G 59/18* | (2006.01) | |

(52) U.S. Cl.
CPC .................. *C08J 5/24* (2013.01); *B32B 7/12* (2013.01); *B32B 15/14* (2013.01); *B32B 15/20* (2013.01); *C08G 59/226* (2013.01); *C08G 59/504* (2013.01); *C08G 59/56* (2013.01); *C08J 5/043* (2013.01); *C08L 63/00* (2013.01); *C09J 163/00* (2013.01); *B32B 2260/021* (2013.01); *B32B 2260/046* (2013.01); *B32B 2262/0269* (2013.01); *B32B 2262/101* (2013.01); *B32B 2262/106* (2013.01); *B32B 2305/076* (2013.01); *B32B 2307/51* (2013.01); *B32B 2603/00* (2013.01); *B32B 2605/00* (2013.01); *C08G 59/182* (2013.01); *C08J 2363/00* (2013.01); *C08J 2463/00* (2013.01); *C08J 2463/02* (2013.01); *C08L 2205/02* (2013.01); *C08L 2205/025* (2013.01); *C08L 2205/03* (2013.01); *C08L 2205/035* (2013.01)

(58) Field of Classification Search
CPC ...................................................... C09J 163/00
USPC .......................................................... 428/413
See application file for complete search history.

(56) References Cited

U.S. PATENT DOCUMENTS

| | | |
|---|---|---|
| 4,908,273 A | 3/1990 | Urech et al. |
| 2011/0058948 A1 | 3/2011 | Jacob et al. |
| 2013/0149934 A1 | 6/2013 | Sang et al. |

FOREIGN PATENT DOCUMENTS

| | | |
|---|---|---|
| CN | 102311614 | 1/2012 |
| EP | 0436944 B1 | 10/1995 |
| GB | 2462996 | 3/2010 |
| JP | 1995118414 | 5/1995 |

OTHER PUBLICATIONS

English translation of CN102311614.

*Primary Examiner* — Duc Truong
(74) *Attorney, Agent, or Firm* — W. Mark Bielawski; David J. Oldenkamp

(57) ABSTRACT

Epoxy formulations comprising a polyfunctional epoxy resin, a solid bisphenol A epoxy resin, a phenolic end capped bisphenol A resin, a rubber epoxy adduct and a curative are provided as is their use in prepregs and as matrix materials in laminates of metal foil and fiber reinforced epoxy resins.

9 Claims, No Drawings

EPOXY RESIN FORMULATIONS

The present invention relates to improved epoxy resin formulations and in particular to epoxy resin formulations that can be used as the curable matrix in the production of prepregs and fibre reinforced epoxy resins. The invention also relates to prepregs containing the resin formulations, d the cured prepreg and laminates containing the cured prepreg, and adhesives containing the formulations. The prepregs are particularly useful in the production of laminates of one or more layers of metal foil and one or more layers of fibre reinforced epoxy resins such as the products known as Glare which are used in the aircraft industry. In these systems the resin formulations must both adhere to the metal foil and cure to provide a fibre reinforced layer of high strength firmly bonded to the metal foil. The cured resins have a glass transition temperature Tg which can be lowered by the presence of moisture and the invention provides resin systems that have improved retention of the Tg and low moisture uptake under wet and/or humid conditions.

A fibrous layer impregnated with a curable resin is known herein as a prepreg and the resin in the prepreg may be uncured or partially cured. Epoxy resin formulations are frequently used in the production of prepregs. Epoxy formulations typically contain epoxy resins which may be selected from a wide range of epoxy containing materials according to the cure cycle to be employed and the nature of the finished article to be produced. Epoxy resins can be solid, liquid or semi-solid and are characterised by their functionality and epoxy equivalent weight.

The functionality of an epoxy resin is the number of reactive epoxy sites per molecule that are available to react and cure to form the cured structure. For example, a bisphenol-A epoxy resin has a functionality of 2, certain glycidly amines can have a functionality of more than 4.

The reactivity of an epoxy resin is indicated by its epoxide content or epoxy equivalent weight (EEW). This is commonly expressed as the epoxide number, which is the number of epoxide equivalents in 1 kg of resin (Eq./kg), or as the equivalent weight, which is the weight in grams of resin containing 1 mole equivalent of epoxide (g/mol). One measure may be simply converted to another:

Equivalent weight (g/mol)=1000/epoxide number (Eq./kg)

The epoxy equivalent weight or epoxide number is used to calculate the amount of co-reactant (hardener) to use when curing epoxy resins. Epoxies are typically cured with stoichiometric or near-stoichiometric quantities of curative to achieve maximum physical properties.

Epoxy formulations also include catalysts and/or curatives and these are also selected according to the nature of the epoxy resin, the product to be produced and the cure cycle that is required.

Epoxy resin systems are generally cured in a mould where several prepreg layers containing the fibrous reinforcement such as carbon fibre, glass fibre, kevlar and/or aramid fibre are superimposed perhaps being interspersed with layers of metal foil. The systems are then cured in the mould by heating.

Cured epoxy resin systems can be brittle and it is well known to include impact modifiers in the epoxy resin systems in order to reduce their brittleness. Typical impact modifiers that have been proposed are thermoplastic materials such as polyamides including nylon 6 and nylon 66 or polyethers, polyvinyl formal, polysulphones and/or polyethersulfones and/or combinations of the aforesaid materials.

The present invention aims to obviate and/or mitigate the above described problems and/or to provide improvements generally.

According to the present invention there is provided a formulation, a prepreg, a structure, an adhesive and a use as defined in any one of the accompanying claims.

The properties required of a prepreg are that when cured it has the required Tg and also has the required mechanical properties according to the use to which it is to be put. In certain applications it is important that the Tg is retained under damp or humid conditions. Additionally when used in the production of laminar structures it must adhere to the adjacent layers in the laminate. In the production of laminates of fibre reinforced epoxy resins and aluminium foils such as the Glare Products, the prepreg bonds the layers of foil to form a laminate structure. In certain embodiments the resin formulation used in the prepreg may also be used as a heat curable adhesive. The adhesive enables voids or cavities which occur in scarf joints to be filled.

The present invention provides an epoxy resin formulation suitable for such applications a prepreg containing the formulation, a cured prepreg and laminates containing the cured prepreg.

The invention therefore provides a formulation comprising
a) a polyfunctional epoxy resin
b) a solid bis phenol A epoxy resin
c) a rubber epoxy adduct
d) a phenolic end capped bis phenol A resin
e) a curative system.

It is preferred that the formulations of this invention are liquid at ambient temperature.

The formulations of the present invention are useful in the formation of prepregs which are an embodiment of this invention. The prepregs of this invention may contain glass fibre, carbon fibre and/or aramid fibre and in a preferred embodiment they are intended to be laid-up with other layers of materials which may be other composite materials (e.g. other prepregs according to the invention or other prepregs) to produce a prepreg stack which can be cured to produce a fibre reinforced laminate. In preferred embodiments the prepregs may be laid up with other layers such as solid sheets, or laminates, or metal foils such as steel and for aluminium foil and are preferably interspersed with such foils.

The prepreg is typically produced as a roll of prepreg and in view of the tacky nature of such materials, a backing sheet is generally provided to enable the roll to be unfurled at the point of use. Thus, preferably the prepreg according to the invention comprises a backing sheet on an external face. The backing sheet may comprise a polyolefin based polymer material such as polyethylene or polypropylene based polymers.

Epoxy Resin

The epoxy resin used in this invention is polyfunctional. This means that is it has functionality of at least 2, preferably a functionality of 3 or 4. It preferably has a high reactivity as indicated by an EEW in the range from 100 to 1500 preferably an EEW in the range of from 100 to 250.

Suitable difunctional epoxy resins, by way of example, include those based on: diglycidyl ether of bisphenol F, diglycidyl ether of bisphenol A (optionally brominated), phenol and cresol epoxy novolacs, glycidyl ethers of phenol-aldehyde adducts, glycidyl ethers of aliphatic diols, diglycidyl ether, diethylene glycol diglycidyl ether, aromatic epoxy resins, aliphatic polyglycidyl ethers, epoxidized olefins, brominated resins, aromatic glycidyl amines, heterocyclic glycidyl imidines and amides, glycidyl ethers, fluorinated epoxy resins, glycidyl esters or any combination thereof. The solid bisphenol A epoxy resin used in the formulation of this invention may also be one of these materials.

Suitable trifunctional epoxy resins, by way of example, may include those based upon phenol and cresol epoxy novolacs, glycidyl ethers of phenol-aldehyde adducts, aromatic epoxy resins, aliphatic triglycidyl ethers, dialiphatic triglycidyl ethers, aliphatic polyglycidyl amines, heterocyclic glycidyl imidines and amides, glycidyl ethers, fluorinated epoxy resins, or any combination thereof. Suitable trifunctional epoxy resins are available from Huntsman Advanced Materials under the tradenames MY0500 and MY0510 (triglycidyl para-aminophenol) and MY0600 and MY0610 (triglycidyl meta-aminophenol). Triglycidyl meta-aminophenol is also available from Sumitomo Chemical Co. (Osaka, Japan) under the tradename ELM-120.

Tetrafunctional resins are preferred resins for use as the multifunctional resin for the formulation of this invention and suitable tetrafunctional epoxy resins include N,N, N',N'-tetraglycidyl-m-xylenediamine (available commercially from Mitsubishi Gas Chemical Company under the name Tetrad-X, and as Erisys GA-240 from CVC Chemicals), and N,N,N',N'-tetraglycidylmethylenedianiline (e.g. MY0720 and MY0721 from Huntsman Advanced Materials). Other suitable multifunctional epoxy resins include DEN438 (from Dow Chemicals, Midland, Mich.) DEN439 (from Dow Chemicals), Araldite ECN 1273 (from Huntsman Advanced Materials), Araldite ECN 1299 and Araldite MY9512 (from Huntsman Advanced Materials).

The formulation of this invention also includes a phenolic end capped bisphenol A resin. Suitable resins, by way of example, include those based on: diglycidyl ether of bisphenol F, diglycidyl ether of bisphenol A (optionally brominated), phenol and cresol epoxy novolacs, glycidyl ethers of phenol-aldelyde adducts, glycidyl ethers of aliphatic diols, diglycidyl ether, diethylene glycol diglycidyl ether, aromatic epoxy resins, aliphatic polyglycidyl ethers, epoxidized olefins, brominated resins, aromatic glycidyl amines, heterocyclic glycidyl imidines and amides, glycidyl ethers, fluorinated epoxy resins, glycidyl esters or any combination thereof. An example of a suitable resin is Araldite EP820.

Curing Agent

The curing agents assist the curing of the formulation of the present invention by crosslinking of the epoxy resins and other ingredients in the formulation. The amount of curing agents or curing agent accelerators present in the formulation ranges from about 1% by weight to about 15% by weight and more typically from about 2 to about 12 wt %, preferably from about 3 to about 11 wt %, more preferably from 3.5 wt % to 9.5 wt % and most preferably from about 4 to about 6 wt % based on the weight of the formulation and/or combinations of the aforesaid wt % ranges. The curing agent materials can be selected from aliphatic or aromatic amines or their respective adducts, amidoamines, polyamides, cycloaliphatic amines, anhydrides, polycarboxylic polyesters, isocyanates, phenol-based resins (e.g., phenol or cresol novolak resins, copolymers such as those of phenol terpene, polyvinyl phenol, or bisphenol-A formaldehyde copolymers, bishydroxyphenyl alkanes or the like), dihydrazides, sulfonamides, sulfones such as diamino diphenyl sulfone, anhydrides, mercaptans, imidazoles, ureas, tertiary amines, BF3 complexes or mixtures thereof. Particular preferred curing agents include modified and unmodified polyamines or polyamides such as triethylenetetramine, diethylenetriamine tetraethylenepentamine, cyanoguanidine, dicyandiamides and the like. Diamino diphenyl sulphone is particularly preferred.

An accelerator for the curing agents (e.g., a modified or unmodified urea such as methylene diphenyl bis urea, an imidazole, blocked amine or a combination thereof) may also be provided for preparing the formulation. Sulfones such as the amino aromatic sulfones particularly diamino diphenyl sulfone are preferred curatives for a prepreg based on glass fibre and is used for lamination to metal foil as the adhesion to the metal foil is good and the retention of the Tg of the cured resin under wet or humid conditions is also good and the moisture uptake is low.

The formulation may contain other additives such as flexibilizers, impact modifiers, polymers or copolymers fillers and other elongation promoting additives.

Reinforcing Fibres

The reinforcing fibres employed in the prepreg may be synthetic or natural fibres or any other form of material or combination of materials that combined with the resin composition of the invention form a composite product. The reinforcement web can either be provided via spools of fibre that are unwound or from a roll of textile. Exemplary fibres include glass, carbon, graphite, boron, ceramic metalized fibres and aramid fibres. Preferred fibres are carbon, aramid, and/or glass fibres and/or combinations of the aforesaid materials. Hybrid or mixed fibre systems may also be envisaged. The use of cracked (i.e. stretch-broken) or selectively discontinuous fibres may be advantageous to facilitate lay-up of the product according to the invention and improve its capability of being shaped. Although a unidirectional fibre alignment is preferable, other forms may also be used. The surface mass of fibres within the fibrous reinforcement is generally 80-4000 g/m$^2$, preferably 100-2500 g/m$^2$, and especially preferably 150-2000 g/m$^2$ and/or combinations of the aforesaid ranges. The number of carbon filaments per tow can vary from 3000 to 320,000, again preferably from 6,000 to 160,000 and most preferably from 12,000 to 48,000. For fibreglass reinforcements, fibres of 600-2400 tex are particularly suitable.

Exemplary layers of unidirectional fibrous tows are made from HexTow® carbon fibres, which are available from Hexcel Corporation. Suitable HexTow® carbon fibres for use in making unidirectional fibre tows include: IM7 carbon fibres, which are available as tows that contain 6,000 or 12,000 filaments and weight of 0.223 g/m and 0.446 g/m respectively; IM8-IM10 carbon fibres, which are available as tows that contain 12,000 filaments and weigh from 0.446 g/m to 0.324 g/m; and AS7 carbon fibres, which are available in tows that contain 12,000 filaments and weigh 0.800 g/m, tows containing up to 80,000 or 50,000 (50K) filaments may be used such as those containing about 25,000 filaments available from Toray and those containing about 50,000 filaments available from Zoltek. The tows typically have a width of from 3 to 7 mm and are fed for impregnation on equipment employing combs to hold the tows and keep them parallel and unidirectional.

The structural fibres will be chosen according to the use of the prepreg. Glass and carbon fibres are preferred. Alternative fibres may comprise Aramid®, Twaron™, Innegra™ Kevlar™. Glass fibres are preferred in prepregs to be used in laminates with metal foil, such as aluminium foil as in the products known as Glare. The structural fibres, may be individual tows made up of a multiplicity of individual fibres and they may be woven or non-woven fabrics. The fibres may be unidirectional, bidirectional or multidirectional according to the properties required in the final laminate. Typically the fibres will have a circular or almost circular cross-section with a diameter in the range of from 3 to 20 µm, preferably from 5 to 12 µm. Different fibres may be used in different prepregs used to produce a cured laminate. A preferred glass fibre grade is S2 or R type glass and grade S2-463-AA-750 is particularly preferred. A prepreg having a glass fibre content of from 20 to 35 wt % preferably from 25 to 30 wt % is particular preferred for lamination to metal foil particularly aluminium foil.

Once prepared the prepreg may be rolled-up, so that it can be stored for a period of time. It can then be unrolled and cut as desired and optionally laid up with other prepregs to form a prepreg stack in a mould or in a vacuum bag which is subsequently placed in a mould and cured.

One desirable property for the epoxy formulations of this invention is that upon curing they have a high elongation at break so that fracture is delayed when deformation occurs. In addition high strain to failure materials are often, but not always, more impact resistant.

The elongation of the cured prepreg and laminates containing it indicate its ability to deform under stress, the greater the elongation the greater the ability to deform without fracturing. An example of the benefit of high elongation is when the substrate or substrates upon which the formulation is employed undergoes plastic deformation such as can happen to metal components in an automobile crash where the use of an adhesive with high elongation (coupled with the desired bond strength) can result in areas remaining stabilized. A high level of elongation becomes particularly important as the thickness of the material utilized increases.

We have found that such a desirable combination of properties may be achieved by employing a rubber epoxy adduct in the formulations of the invention. The rubber epoxy adduct is compatible with the epoxy resins as the formulation cures to provide the required strength and Tg and the thermoplastic component contributes to providing the required elongation.

Rubber/Epoxy Adduct

The rubber epoxy adduct is preferably an epoxy/elastomer adduct. These materials generally includes about 1:5 to 5:1 parts of epoxy to elastomer, and more preferably about 1:3 to 3:1 parts of epoxy to elastomer. More typically, the adduct includes at least about 5%, more typically at least about 12% and even more typically at least about 18% elastomer and also typically includes not greater than about 50%, even more typically no greater than about 40% and still more typically no greater than about 35% elastomer, although higher or lower percentages are possible. The elastomer suitable for the adduct may be functionalized at either the main chain or the side chain. Suitable functional groups include, but are not limited to, —COOH, —NH$_2$, —NH—, —OH, —SH, —CONH$_2$, —CONH—, —NHCONH—, —NCO, —NCS, and oxirane or glycidyl group etc. The elastomer optionally may be vulcanizeable or post-crosslinkable. Exemplary elastomers include, without limitation, natural rubber, styrene-butadiene rubber, polyisoprene, polyisobutylene, polybutadiene, isoprenebutadiene copolymer, neoprene, nitrile rubber, butadiene-acrylomitrile copolymer, butyl rubber, polysulfide elastomer, acrylic elastomer, acrylonitrile elastomers, silicone rubber, polysiloxanes, polyester rubber, disocyanatelinked condensation elastomer, EPDM (ethylene-propylene diene rubbers), chlorosulfonated polyethylene, fluorinated hydrocarbons, thermoplastic elastomers such as (AB) and (ABA) type of block copolymers of styrene and butadiene or isoprene, and (AB)n type of multi-segment block copolymers of polyurethane or polyester, and the like. In the case that carboxyl-terminated butadiene-acrylonitrile (CTBN) is used as the functionalized elastomer, the preferable nitrile content is from 12-35% by weight, more preferably from 20-33% by weight.

An example of a preferred epoxide-functionalized epoxy/elastomer adduct is sold in admixture with an epoxy resin under the trade name HyPox™ RK84 (Figure 5), a bisphenol A epoxy resin modified with CTBN elastomer, and under the trade name HyPox™ RA1340, an epoxy phenol novolac resin modified with CTBN elastomer, both commercially available from CVC Thermoset Specialities, Moorestown, N.J. In addition to bisphenol A epoxy resins, other epoxy resins may be used to prepare the epoxy/elastomer adduct, such as n-butyl glycidyl ether, styrene oxide and phenylglycidyl ether; bifunctional epoxy compounds such as bisphenol A diglycidyl ether, bisphenol F diglycidyl ether, bisphenol S diglycidyl ether and diglycidyl phthalate; trifunctional compounds such as triglycidyl isocyanurate, triglycidyl p-aminophenol; tetrafunctional compounds such as tetraglycidyl m-xylene diamine and tetraglycidyldiaminodiphenylmethane; and compounds having more functional groups such as cresol novolac polyglycidyl ether, phenol novolac polyglycidyl ether and so on.

The combination of the rubber/epoxy adduct and a sulfone curative is particularly useful in formulations used as the matrix in glass fibre based prepregs to be used for lamination to metal foils. We have found that when employing this combination, the Tg of the cured resin in the prepreg is retained under damp and humid conditions and the moisture uptake of the cured prepreg is low.

The preferred concentrations of the components in the epoxy formulation of this invention depend upon the intended application of the formulation material.

The preferred range of proportions of the component of the epoxy resin formulation is set out in the following table.

TABLE 1

Epoxy resin formulation

| Component | Minimum (% by weight of composition) | Maximum (% by weight of composition) |
| --- | --- | --- |
| Polyfunctional epoxy resin | 15 | 35 |
| Solid bisphenol A epoxy resin | 20 | 35 |
| Rubber epoxy adduct | 20 | 40 |
| Phenolic end capped bis phenol A resin | 2 | 12 |
| Curative system | 3 | 17 |

The epoxy resin formulation of the present invention is particularly useful as the matrix in prepregs although it may also be used as an adhesive (e.g., structurally adhering) a first surface of one, two or more components (e.g., members) to a second surface of one, two or more components. Such adhesion can provide structural integrity and/or adhesion to components or articles.

The prepregs of this invention are produced by impregnating the fibrous material with the epoxy resin formulation. In order to increase the rate of impregnation, the process is preferably carried out at an elevated temperature so that the viscosity of the resin formulation is reduced. However it must not be so hot for a sufficient length of time that premature curing of the resin occurs. Thus, the impregnation process is preferably carried out at temperatures in the range of from 40° C. to 80° C.

The resin formulation can be spread onto the external surface of a roller and coated onto a paper or other backing material to produce a layer of curable resin. The resin formulation can then be brought into contact with the fibrous layer for impregnation perhaps by the passage through rollers. The resin formulation may be present on one or two sheets of backing material, which are brought into contact with the structural fibrous layer and by passing them through heated consolidation rollers to cause impregnation. Alternatively the resin formulation can be maintained in liquid form in a resin bath either being a resin that is liquid at ambient temperature or being molten if it is a resin that is solid or semi-solid at ambient temperature. The liquid resin formulation can then be applied to a backing employing a doctor blade to produce a film of the resin formulation on a release layer such as paper or polyethylene film. The structural fibrous layer may then be placed onto the resin formulation and optionally a second layer of the resin formulation may be provided on top of the fibrous layer.

The preferred process for producing prepregs is a continuous process involving the passage of many thousands of fibres through a series of stages, typically guided by rollers. The point where the fibres meet the epoxy resin formulation of the invention, is the start of the impregnation stage. Before the fibres are contacted with the resin formulation and reach the impregnation zone, they are typically arranged in a plurality of tows, each tow comprising many thousands of filaments, e.g. 12,000. These tows are mounted on bobbins and are fed initially to a combing unit to ensure even separation of the fibres. It has been found that unusually low fibre tensions just after the bobbin feed position provide further improvement to the disruption of the fibres in the eventual prepreg. Thus, the tension per filament at this position is preferably from 0.0007 to 0.025 g, preferably from 0.01 to 0.015 g.

In the process a second layer of the resin formulation maybe brought into contact with the other face of the fibres typically at the same time as the first layer, compressing the first and second layers of resin such that resin enters the interstices of the fibres. Such a process is considered to be a one-stage process because, although each face of the fibres is contacted with one resin layer, all the resin in the eventual prepreg is impregnated in one stage.

Resin impregnation typically involves passing the resin formulation and fibres over rollers, which may be arranged in a variety of ways. Two primary arrangements are the simple "nip" arrangement and the "S-wrap" arrangement.

An S-wrap stage is wherein the resin formulation and fibres, both in sheet form pass around two separated rotating rollers in the shape of the letter "S", known as S-wrap rollers. Alternative roller arrangements include the widely used "nip" wherein the fibre and the resin formulation are pinched, or nipped, together as they pass between the pinch point between two adjacent rotating rollers. Nip stages may also be used, provided the pressures are kept low, e.g. by control over the gap between adjacent rollers.

It has been found that although large pressures in theory provide excellent resin impregnation by the resin formulation, they can be detrimental to the outcome of the prepreg in the one-stage process.

Thus, it is preferred that the pressure exerted onto the fibres and the resin formulation preferably using nip rollers does not exceed 35 kg per centimeter of width of the fibre layer, more preferably does not exceed 30 kg per centimeter.

For example, when in S-wrap arrangement, two rollers are preferably spaced apart to provide a gap between the centres of them of from 250 to 600 mm, preferably from 280 to 360 mm, most preferably from 300 to 340 mm, e.g. 320 mm.

Two adjacent pairs of S-wrap rollers are preferably separated between the centres of respective rollers of from 200 to 1200 mm, preferably from 300 to 900 mm, most preferably from 700 to 900 mm, e.g. 800 mm.

The impregnation rollers may rotate in a variety of ways. They may be freely rotating or driven. If driven, they are conventionally driven so that there is no difference between the speed of rotation and the speed of passage of the resin formulation and fibres over the rollers. Sometimes it may be desirable to apply a slight increased speed or decreased speed relative to the passage of the resin formulation and the fibres. Such a difference is referred to in the art as "trim".

Following impregnation of the resin formulation into the fibres, often there is a cooling stage and further treatment stages such as laminating, slitting and separating.

The moulding material or structure of the invention may be characterized by the resin content of the resin formulation and/or its fibre volume and resin formulation volume and/or its degree of impregnation as measured by the water up take test.

Resin formulation and fibre content of uncured moulding materials or structures are determined in accordance with ISO 11667 (method A) for moulding materials or structures which contain fibrous material which does not comprise unidirectional carbon. Resin and fibre content of uncured moulding materials or structures which contain unidirectional carbon fibrous material are determined in accordance with DIN EN 2559 A (code A). Resin formulation and fibre content of cured moulding materials or structures which contain carbon fibrous material are determined in accordance with DIN EN 2564 A.

The fibre and resin formulation volume % of a prepreg moulding material or structure can be determined from the weight % of fibre and resin by dividing the weight % by the respective density of the resin formulation and carbon fibre.

The % of impregnation of a tow or fibrous material which is impregnated with resin formulation is measured by means of a water pick up test.

The water pick up test is conducted as follows. Six strips of prepreg are cut to size 100 (+/−2) mm×100 (+/−2) mm. Any backing sheet material is removed. The samples are weighed near the nearest 0.001 g (W1). The strips are located between PTFE backed aluminium plates so that 15 mm of the prepreg strip protrudes from the assembly of PTFE backed plates on one end and whereby the fibre orientation of the prepreg is extends along the protruding part. A clamp is placed on the opposite end, and 5 mm of the protruding part is immersed in water having a temperature of 23° C., relative air humidity of 50%+/−35%, and at an ambient temperature of 23° C. After 5 minutes of immersion the sample is removed from the water and any exterior water is removed with blotting paper. The sample is then weighed again W2. The percentage of water uptake WPU (%) is then calculated by averaging the measured weights for the six samples as follows: WPU (%)=[(<W2>−<W1>)/<W1>)×100. The WPU (%) is indicative of the Degree of Resin Impregnation (DRI).

Typically, the values for the resin formulation content by weight for the uncured prepreg of the invention are in the ranges of from 15 to 70% by weight of the prepreg, from 18 to 68% by weight of the prepreg, from 20 to 65% by weight of the prepreg, from 25 to 60% by weight of the prepreg, from 25 to 55% by weight of the prepreg, from 25 to 50% by weight of the prepreg, from 25 to 45% by weight of the prepreg, from 25 to 40% by weight of the prepreg, from 25 to 35% by weight of the prepreg, from 25 to 30% by weight of the prepreg, from 30 to 55% by weight of the prepreg, from 35 to 50% by weight of the prepreg and/or combinations of the aforesaid ranges.

At room temperature (23° C.), the resin formulation preferably has a relatively high viscosity, typically in the range of from 1000 to 100,000 Pa·s, more typically in the range of from 5000 Pa·s to 500,000 Pa·s. Also, the resin formulation may be tacky. Tack is a measure of the adhesion of a prepreg to a tool surface or to other prepreg plies in an assembly. Tack may be measured in relation to the resin itself or in relation to the prepreg in accordance with the method as disclosed in "Experimental analysis of prepreg tack", Dubois et al, (LaMI)UBP/IFMA, 5 Mar. 2009. This publication discloses that tack can be measured objectively and repeatably by using the equipment as described therein and by measuring the maximum debonding force for a probe which is brought in contact with the resin or prepreg at an initial pressure of 30N at a constant temperature of 30° C. and which is subsequently displaced at a rate of 5 mm/min. For these probe contact parameters, the tack $F/F_{ref}$ for the resin is in the range of from 0.1 to 0.6 where $F_{ref}=28.19N$ and F is the maximum debonding force. For a prepreg, the tack $F/F_{ref}$ is in the range of from 0.1 to 0.45 for $F/F_{ref}$, preferably from 0.3 to 0.40 $F/F_{ref}$, more preferably from 0.32 to 0.39 $F/F_{ref}$ where $F_{ref}=28.19N$ and F is the maximum debonding force. However, a fibrous support web, grid or scrim may also be located on at least one exterior surface of the fibrous reinforcement to further enhance the integrity of the material or structure during handling, storage and processing.

The epoxy resin formulation of the invention which is used as the matrix resin material in the prepreg preferably has a storage modulus G' of from $3\times10^5$ Pa to $1\times10^8$ Pa and a loss modulus G" of from $2\times10^6$ Pa to $1\times10^8$ Pa at room temperature (20° C.).

Preferably, the resin formulation has a storage modulus G' of from $1\times10^6$ Pa to $1\times10^7$ Pa, more preferably from $2\times10^6$ Pa to $4\times10^6$ Pa at room temperature (20° C.).

Preferably, the resin formulation has a loss modulus G" of from $5\times10^6$ Pa to $1\times10^7$ Pa, more preferably from $7\times10^6$ Pa to $9\times10^6$ Pa at room temperature (20° C.).

Preferably, the resin formulation has a complex viscosity of from $5\times10^5$ Pa to $1\times10^7$ Pa·s, more preferably from $7.5\times10^5$ Pa to $5\times10^6$ Pa·s at room temperature (20° C.).

Preferably, the resin formulation has a complex viscosity of from $1\times10^6$ Pa to $2\times10^6$ Pa·s. more preferably from 5 to 30 Pa·s at 80° C. Preferably, the resin formulation has a viscosity of from 10 to 25 Pa·s at 80° C.

Preferably, the prepreg moulding material is elongate in a longitudinal direction thereof and the fibrous reinforcement is unidirectional along the longitudinal direction of the prepreg.

The behaviour of thermosetting prepreg materials is highly viscoelastic at the typical lay-up temperatures used. The elastic solid portion stores deformation energy as recoverable elastic potential, whereas a viscous liquid flows irreversibly under the action of external forces.

This complex viscosity is obtained using a rheometer to apply an oscillation experiment. From this the complex modulus G* is derived as the complex oscillation which is applied to the material is known (Principles of Polymerization, John Wiley & Sons, New York, 1981).

In viscoelastic materials the stress and strain will be out of phase by an angle delta. The individual contributions making the complex viscosity are defined as G' (Storage Modulus)=G*×cos (delta); G" (Loss Modulus)=G*×sin (delta). This relationship is shown in FIG. 8 of WO 2009/118536.

G* is the complex modulus. G' relates to how elastic the material is and defines its stiffness.

G" relates to how viscous a material is and defines the damping, and liquid non recoverable flow response of the material.

For a purely elastic solid (glassy or rubbery), G"=0 and the phase angle delta is 0°, and for a purely viscous liquid, G'=0 and the phase angle delta is 90°.

The loss modulus G" indicates the irreversible flow behaviour and a material with a high loss modulus G" is also desirable to prevent the early creep-like flow and maintain an open air path for longer. Therefore the resin formulation of the present invention has a high storage modulus and a high loss modulus, and correspondingly a high complex modulus, at a temperature corresponding to a typical lay-up temperature, such as room temperature (21° C.).

In this specification, the viscoelastic properties, i.e. the storage modulus, loss modulus and complex viscosity, of the resin formulation used in the prepregs of the present invention were measured at application temperature (i.e. a lay-up temperature of 20° C.) by using a Bohlin VOR Oscillating Rheometer with disposable 25 mm diameter aluminium plates. The measurements were carried out with the following settings: an oscillation test at increasing temperature from 50° C. to 150° C. at 2° C./mm with a controlled frequency of 1.59 Hz and a gap of 500 micrometer.

Typically, the stiffness of the viscoelastic prepreg is characterised by the resin formulation exhibiting a high elastic rheological response. The resin formulation rheology is characterised by a storage modulus G' of the resin formulation at room temperature, preferably between $3\times10^5$ Pa and $1\times10^8$ Pa at 20° C., more preferably from $1\times10^6$ Pa to $1\times10^7$ Pa, yet more preferably from $2\times10^6$ Pa to $4\times10^6$ Pa. The higher the storage modulus at room temperature (20° C.), the greater the air transport properties of the prepreg stack. However, the upper limit of the storage modulus is limited because otherwise the prepreg would become too rigid and would develop a tendency to snap as the prepreg is being laminated.

In the manufacture of a structural member using the prepreg moulding material or structure of the present invention, preferably the resin formulation has a high loss modulus G" between $2\times10^6$ Pa and $1\times10^8$ Pa at 20° C., more preferably from $5\times10^6$ Pa to $1\times10^7$ Pa, yet more preferably from $7\times10^6$ Pa to $9\times10^6$ Pa.

The resin formulation preferably has a high complex viscosity at 20° C. of from $5\times10^5$ Pa to $1\times10^7$ Pa·s, more preferably from $7.5\times10^5$ Pa to $5\times10^6$ Pa·s, yet more preferably from $1\times10^6$ Pa to $2\times10^6$ Pa·s.

In order to produce final laminates with substantially uniform mechanical properties it is important that the structural fibres and the epoxy resin formulation be mixed to provide a substantially homogenous prepreg. This requires uniform distribution of the structural fibres within the prepreg to provide a substantially continuous matrix of the resin formulation surrounding the fibres. It is therefore important to minimise the encapsulation of air bubbles within the resin formulation during application to the fibres. It is therefore preferred to use high viscosity resins. The prepregs should contain a low level of voids in order, and it is therefore preferred that each prepreg and the prepreg stack has a water pick-up value of less than 9%, more preferably less than 6%, most preferably less than 3%.

Where the prepreg is to be used in laminates where the fibre reinforced epoxy layer is interspersed between metal foils, the metal foil is preferably steel or aluminium and aluminium foils of thickness 0.01 to 10 mm, preferably from 0.07 to 5 mm, more preferably from 0.1 to 2 mm, or from 0.2 to 0.5 mm are particularly preferred. Alternatively, the foil may comprise an organic material such as a fibre reinforced laminate. The fibre reinforced laminate may comprise a thermoset or a thermoplastic resin material.

Once it is created in the mould, the prepreg, prepreg stack or prepreg and other (metal) layers may be bonded and cured by exposure to an externally applied elevated temperature in the range of from 70° C. to 150° C., preferably from 11° C. to 130° C. and more preferably from 120° C. to 125° C., and optionally elevated pressure, to produce a cured laminate.

Curing is preferably conducted in an autoclave. Curing may also be achievable by the so-called vacuum bag technique. This involves placing the prepreg, prepreg stack or combination of layers of prepreg and layers of other materials in an air-tight bag and creating a vacuum on the inside of the bag, the bag being placed in a mould prior to or after creating the vacuum and the resin is then cured by externally applied heat to produce the moulded laminate. The use of the vacuum bag has the effect that the stack experiences a consolidation pressure of up to atmospheric pressure, depending on the degree of vacuum applied.

Upon curing, the prepreg, prepreg stack or laminar structure becomes a composite laminate, suitable for use in a structural application, such as for example an automotive, marine vehicle or an aerospace structure or a wind turbine structure such as a shell for a blade or a spar. Such composite laminates can comprise structural fibres at a level of from 80% to 15% by volume, preferably from 58% to 65% by volume.

The formulations are particularly useful in the production of prepregs based on glass or carbon fibre and particularly for those that are used as the matrix in the production of prepregs used in laminates with metal foils such as aluminium foils to produce glass laminate aluminium reinforced epoxy systems composed of several very thin layers of aluminium interspersed with layers of glass fibre reinforced cured prepreg. The epoxy resin formulation of this invention is particularly useful as the matrix composition, where it is preferred that the resin formulation has a viscosity at room temperature in the range of 100 Pa·s to 1000 Pa·s at 60° C., an onset of cure at from 100° C. to 160° C., preferably from 120° C. to 140° C. to produce a cured resin of Tg from 100° C. to 150° C.

An Automated Tape Laying (ATL) machine is an apparatus which automatically deposits strips of composite material provided in the form of a tape. ATL machines rely on the inherent tack of a composite material to deposit a tape to the surface below. The formulations of the present invention are particularly suited for use as a resin in an ATL tape. The formulation exhibits suitable tack for ATL deposition when combined with a fibrous reinforcement. The tack of the formulation can also be increased by heating with an ATL apparatus. The present invention is particularly suited for controlling tack level by heating because of the content of solid bis-phenol A epoxy resin which reduces the formulations viscosity when heated. Alternatively, the tack can also be increased by replacing some of the solid-bisphenol A epoxy resin with a semi solid or liquid variant of bisphenol epoxy. Preferably between 100% and 1% of the solid-bisphenol A is replaced with a semi-solid or liquid bisphenol A, more preferably between 20 and 1%, most preferably between 10 and 4%. Preferably the solid Bisphenol A resin is replaced in part by a liquid bisphenol A epoxy resin with an EEW of from 160 to 500. An exemplary liquid bisphenol A resin is Epikote™ 828 by Momentive. The present invention is particularly suited for use as a matrix in an ATL tape that further comprises fibrous reinforcement and a metal foil. The present invention is also suited to being used in a tape that is capable of being deposited onto a metal foil and a metal foil being deposited on to it.

The invention is illustrated but in no way limited by the following example in which the following formulation was prepared.

TABLE 2

Example formulation

| Component | % |
|---|---|
| Araldite MY9512 (tetrafunctional epoxy EEW 125 g/eq) | 20.5 |
| Hypox RA 1340 (liquid rubber - epoxy adduct EEW 350 e/eq\) | 31 |
| Araldite GT6071 (solid bis A epoxy EEW 457 g/eq) | 29 |
| Omicure U-52M (MDI urone) | 5.6 |
| 4,4 DDS (diamino diphenyl sulphone) | 6.7 |
| Araldite EP 820 (phenolic end capped bis A epoxy thermoplastic) | 7.2 |

The formulation was liquid at ambient temperature and was found to have an onset of cure as measured by DSC of 142° C. and a Tg upon curing of 118° C. The resin formulation was found to be useful as the matrix in glass fibre based prepregs used in lamination with aluminium foil.

A prepreg was prepared containing this formulation as the epoxy resin matrix and 27 wt % based on the weight of the prepreg of the S2 glass fibres S2-463-AA-750. The prepreg was cured by heating at 125° C. for 75 minutes. The Tg of the cured resin was 117° C. and after storage under the moist conditions (full immersion in water or 98%/85% immersion in water) the Tg was found to be as shown in the following Table.

TABLE 3

Prepreg properties

| Storage condition | Tg | Moisture Uptake % |
|---|---|---|
| 2 weeks/70° C./full immersion | 83.7 | 0.79 |
| 750 hrs/70° C./98% immersion | 88.2 | 0.74 |
| 750 hrs/70° C./85% immersion | 95.8 | 0.45 |

The invention claimed is:

1. A formulation comprising:
a) a polyfunctional epoxy resin
b) a solid bis phenol A epoxy resin
c) a rubber epoxy adduct
d) a phenolic end capped bis phenol A resin
e) a curative system.

2. A formulation according to claim 1 that is liquid at ambient temperature.

3. A formulation according to claim 1 in which the polyfunctional epoxy resin has a functionality of 3 or 4.

4. A formulation according to claim 1 in which the end capped bisphenol A resin is brominated.

5. A formulation according to claim 1 having a viscosity in the range of from 1000 to 100,000 Pa·s at 23° C.

6. A formulation according to claim 1 having a storage modulus G' of from $3 \times 10^5$ Pa to $1 \times 10^8$ Pa and a loss modulus G" of from $2 \times 10^6$ Pa to $1 \times 10^8$ Pa at 20° C.

7. A prepreg comprising fiber selected from glass fiber, carbon fiber and/or aramid fiber and a formulation according to claim 1.

8. A laminar structure comprising a layer of metal foil in combination with a prepreg according to claim 7.

9. An adhesive comprising a formulation according to claim 1.

* * * * *